(No Model.)
E. A. HILL.
Saw Tooth.
No. 239,098. Patented March 22, 1881.
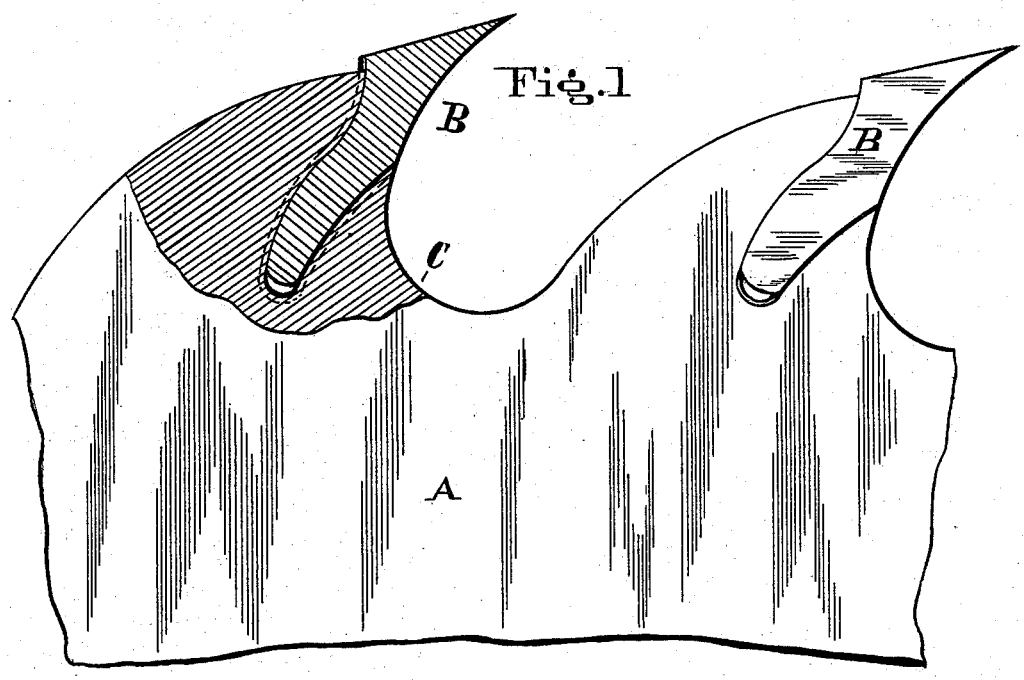
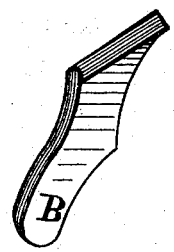
Attest
E. G. Dewald
C. Shiels.
Inventor
Edwin A. Hill
By Geo. J. Murray
Atty

UNITED STATES PATENT OFFICE.

EDWIN A. HILL, OF CINCINNATI, OHIO, ASSIGNOR TO WOODROUGH & McPARLAN, OF SAME PLACE.

SAW-TOOTH.

SPECIFICATION forming part of Letters Patent No. 239,098, dated March 22, 1881.

Application filed September 24, 1880. (No model.)

*To all whom it may concern:*

Be it known that I, EDWIN A. HILL, of the city of Cincinnati, county of Hamilton, State of Ohio, have invented certain new and useful Improvements in Inserted Saw-Teeth, of which the following is a specification.

The object of my invention is to provide a saw-tooth that can be readily inserted and detached from its plate, that will require no keys or other fastening devices, and that will in use firmly lock itself in place without liability of straining the rim of the saw. My improved teeth being located above the gullet of the saw, and held in place within projections similar to the teeth of an ordinary solid saw, they may be filed, upset, and set in line for cutting in the same manner as the teeth of the solid-blade saw, thus combining all the advantages of a solid saw and planer-tooth saw. These objects are attained by the means hereinafter described, and fully illustrated in the accompanying drawings, in which—

Figure 1 is a portion of a circular-saw blade embodying my invention. Fig. 2 is an edge view of the same, with one of the teeth removed; and Fig. 3 is a perspective view of the removed tooth.

A is the blade of the saw. It is first formed into the general shape of an ordinary solid-blade saw. Into the teeth of this blade are cut recesses to receive the insertible teeth B. The rear or outer wall of this recess is in the shape of a double curve, or *cyma reversa*, and the inner or forward wall is a plain curve, nearly concentric with the inner curve of the rear wall. The bottom of the recess is semicircular or curved. The tooth B is made to snugly fit into the recess. The back of the tooth is curved the reverse of the back wall of the recess, and the front has a double curve, the lower or inner curve being the counterpart of the inner curve of the recess, and the upper curve being, when the tooth is in place, the continuation of the throat or gullet C. The portion of the tooth that enters the recess is grooved around the edge, and the walls of the recess are the reverse shape, so that a close joint is formed between the blade and the tooth, and the tooth is held firmly against lateral displacement. That portion of the tooth that is within the recess is about the thickness of the blade A. The projecting portion flares out gradually thicker to the cutting-edge. Thus the tooth forms all of the throat or gullet that is liable to be worn and heated by the sawdust, and being wider in front no dust can pass by to heat the saw or wear the throat thin. Thus a good clearance is always left back of the throat, and the throats are renewed with each new set of teeth.

From the peculiar curve of the recesses and their positions in the teeth of the solid blade it will be seen that the projecting portions of the inserted teeth are but continuations of the solid teeth, and nearly the whole force of the thrust in cutting is resisted by the outer rounded curve of the solid teeth, which correspond to the cutting-points in a solid-blade saw. The teeth are not liable to become loose or fly out, and can only be removed by inserting a key between the butt of the teeth and the bottom of the recesses. They may therefore be filed or upset in the usual manner of sharpening solid-toothed saws without liability of loosening the teeth in their sockets.

If at any time it is desirable to use the saw as a solid-tooth saw, this can be done without the necessity of sending the saw to the shop to be changed.

I claim—

The blade A, having throats or gullets C, and its teeth recessed entirely above said gullets, in combination with the detachable teeth B, the portions of which within the recess are of the same thickness as the blade, and having the double-curved shape shown, and adapted to fit into recesses of corresponding shape, substantially as described.

EDWIN A. HILL.

Witnesses:
JOSHUA L. PIERSON,
HORACE W. WOODROUGH.